(12) United States Patent
Park et al.

(10) Patent No.: US 10,674,175 B2
(45) Date of Patent: Jun. 2, 2020

(54) INTER-PREDICTION METHOD AND APPARATUS IN IMAGE CODING SYSTEM

(71) Applicant: LG ELECTRONICS INC., Seoul (KR)

(72) Inventors: Naeri Park, Seoul (KR); Hyeongmoon Jang, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/331,807

(22) PCT Filed: Aug. 31, 2017

(86) PCT No.: PCT/KR2017/009544
§ 371 (c)(1),
(2) Date: Mar. 8, 2019

(87) PCT Pub. No.: WO2018/056602
PCT Pub. Date: Mar. 29, 2018

(65) Prior Publication Data
US 2019/0246131 A1  Aug. 8, 2019

Related U.S. Application Data

(60) Provisional application No. 62/398,505, filed on Sep. 22, 2016.

(51) Int. Cl.
*H04N 19/51* (2014.01)
*H04N 19/14* (2014.01)
(Continued)

(52) U.S. Cl.
CPC ........... *H04N 19/51* (2014.11); *H04N 19/105* (2014.11); *H04N 19/14* (2014.11); *H04N 19/176* (2014.11);
(Continued)

(58) Field of Classification Search
CPC .... H04N 19/105; H04N 19/14; H04N 19/176; H04N 19/503; H04N 19/51; H04N 19/70; H04N 19/91
See application file for complete search history.

(56) References Cited

U.S. PATENT DOCUMENTS

2010/0215101 A1* 8/2010 Jeon ...................... H04N 19/105
375/240.12

FOREIGN PATENT DOCUMENTS

KR   10-2010-0015456 A   2/2010
KR       10-1420957 B1   7/2014
(Continued)

*Primary Examiner* — Anner N Holder
(74) *Attorney, Agent, or Firm* — Dentons US LLP

(57) ABSTRACT

An inter-prediction method according to the present invention comprises the steps of: deriving a first movement vector of the current block; deriving prediction samples for the current block on the basis of the first movement vector; deriving a subunit located in the current block and adjacent to the target boundary of same; deriving a first reference unit on the basis of the subunit and first movement vector; deriving a second movement vector of a neighboring block adjacent to the target boundary; deriving a second reference unit on the basis of the subunit and second movement vector; and deriving the modified prediction samples on the basis of weighted sum of the first reference unit and second reference unit. According to the present invention, by increasing the effectiveness of inter-prediction at the block boundary, amount of data required for residual data can be reduced and the overall coding efficiency can be increased.

14 Claims, 8 Drawing Sheets

(51) Int. Cl.
*H04N 19/70* (2014.01)
*H04N 19/91* (2014.01)
*H04N 19/105* (2014.01)
*H04N 19/176* (2014.01)
*H04N 19/503* (2014.01)

(52) U.S. Cl.
CPC ........... *H04N 19/503* (2014.11); *H04N 19/70* (2014.11); *H04N 19/91* (2014.11)

(56) References Cited

FOREIGN PATENT DOCUMENTS

| KR | 10-2014-0096130 A | 8/2014 |
|---|---|---|
| KR | 10-1540167 B1 | 8/2015 |
| WO | 2015-0142070 A1 | 9/2015 |

\* cited by examiner (b)

(a)

: OBMC applying region (a)

(b)

: OBMC applying region

INTER-PREDICTION METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2017/009544, filed on Aug. 31, 2017, which claims the benefit of U.S. Provisional Application No. 62/398,505 filed on Sep. 22, 2016, the contents of which are all hereby incorporated by reference herein in their entirety.

BACKGROUND OF THE INVENTION

Field of the Invention

The present invention relates to an image coding technique and, more particularly, to an inter-prediction method and apparatus in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for enhancing image coding efficiency.

The present invention also provides a method and apparatus for enhancing prediction performance.

The present invention also provides a method and apparatus for enhancing inter-prediction performance.

The present invention also provides a method for reducing a prediction error at a block boundary.

In an aspect, an inter-prediction performed by an encoding device is provided. The method includes deriving prediction samples for a current block; deriving a first motion vector of the current block; deriving prediction samples for the current block based on the first motion vector; deriving a subunit located in the current block and adjacent to a target boundary of the current block; deriving a first reference unit based on the subunit and the first motion vector; deriving a second motion vector of a neighboring block adjacent to the target boundary; deriving a second reference unit based on the subunit and the second motion vector; and deriving modified prediction samples based on a weighted sum of the first reference unit and the second reference unit; and encoding inter-prediction information and outputting encoded inter-prediction information.

In another aspect, an encoding device for inter-prediction is provided. The encoding device includes a predictor deriving prediction samples for a current block, deriving a first motion vector of the current block, deriving a subunit located in the current block and adjacent to a target boundary of the current block, deriving a first reference unit based on the subunit and the first motion vector, deriving a second motion vector of a neighboring block adjacent to the target boundary, deriving a second reference unit based on the subunit and the second motion vector, and deriving modified prediction samples based on a weighted sum of the first reference unit and the second reference unit, and an entropy encoder encoding inter-prediction information and outputting encoded inter-prediction information.

In another aspect, an inter-prediction method performed by a decoding device is provided. The method includes deriving a first motion vector of a current block; deriving prediction samples for the current block based on the first motion vector; deriving a subunit located in the current block and adjacent to a target boundary of the current block; deriving a first reference unit based on the subunit and the first motion vector; deriving a second motion vector of a neighboring block adjacent to the target boundary; deriving a second reference unit based on the subunit and the second motion vector; and deriving modified prediction samples based on a weighted sum of the first reference unit and the second reference unit.

In another aspect, a decoding device for inter-prediction is provided. The decoding device includes an entropy decoder receiving inter-prediction information; and a predictor deriving a first motion vector of a current block based on the inter-prediction information, deriving prediction samples for the current block based on the first motion vector, deriving a subunit located in the current block and adjacent to a target boundary of the current block, deriving a first reference unit based on the subunit and the first motion vector, deriving a second motion vector of a neighboring block adjacent to the target boundary, deriving a second reference unit based on the subunit and the second motion vector, and deriving modified prediction samples based on a weighted sum of the first reference unit and the second reference unit.

According to the present invention, prediction errors of a block boundary may be reduced and inter-prediction performance may be enhanced.

According to the present invention, the amount of data required for residual information may be reduced and overall coding efficiency may be enhanced.

DESCRIPTION OF EMBODIMENTS

Figure 1:
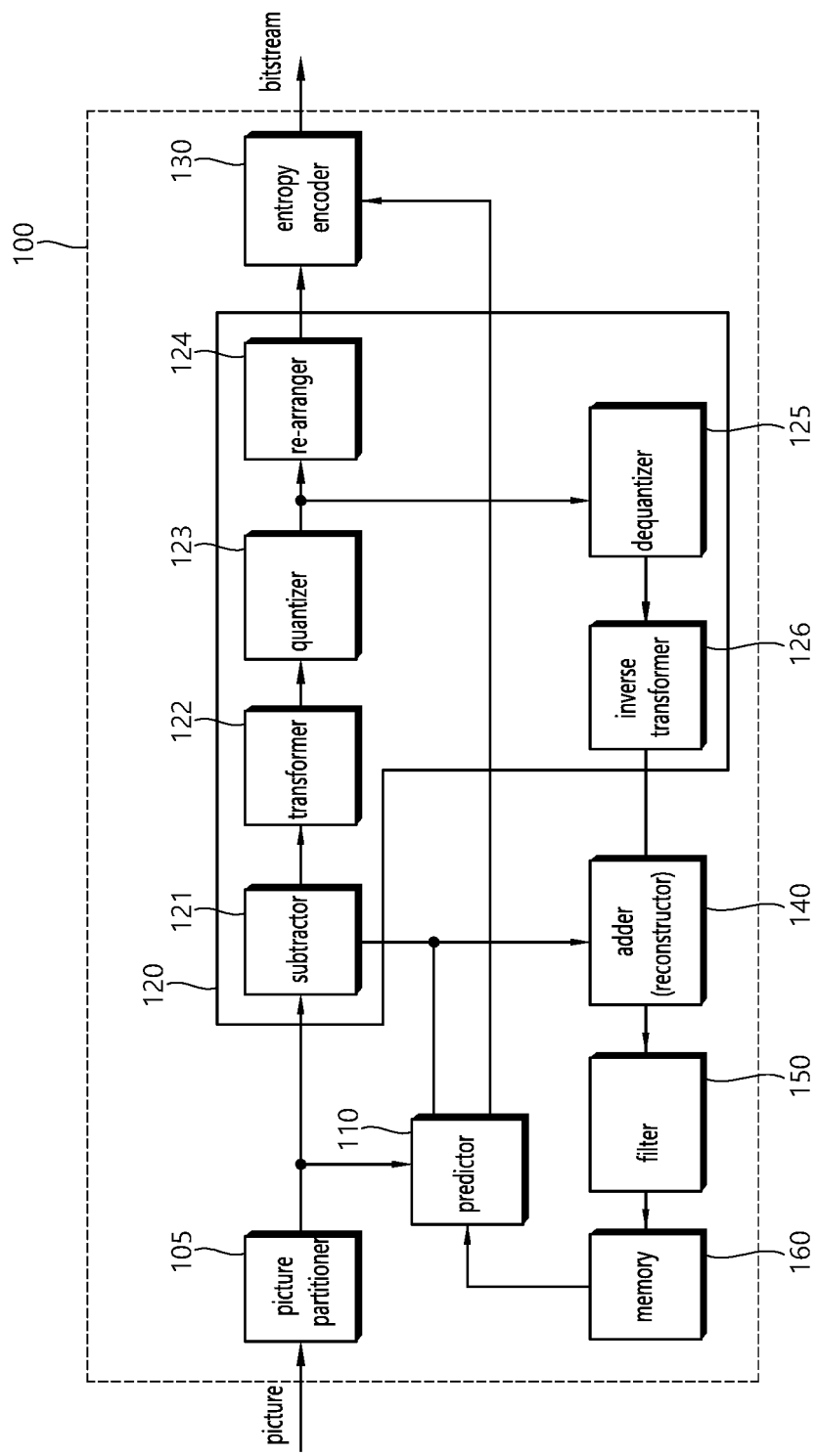
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 may include a picture partitioner 105, a predictor 110, a residual processor 120, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present invention may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method.

Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
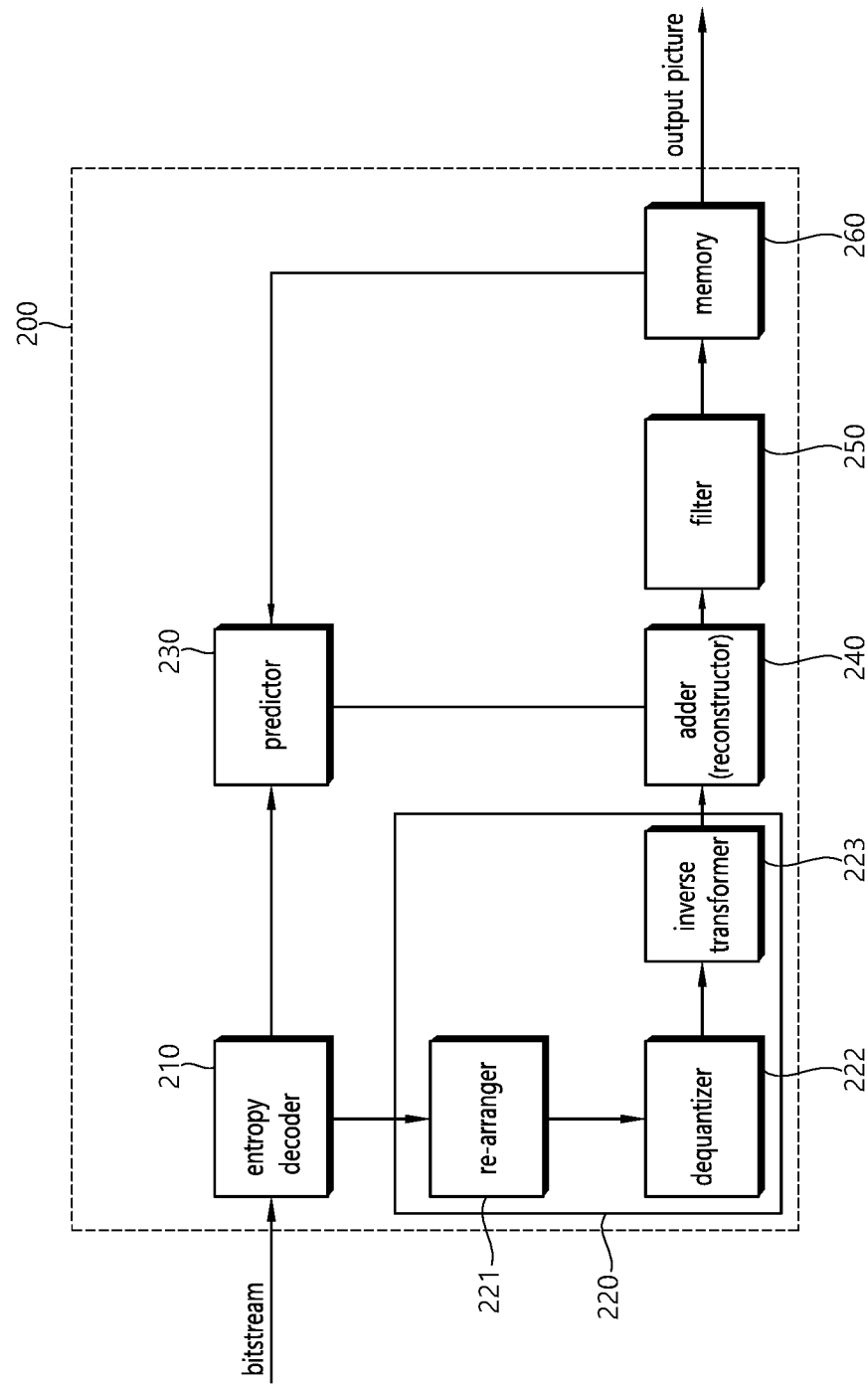
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 may include an entropy decoder 210, a residual processor 220, a predictor 230, an adder 240, a filter 250, and a memory 260. The residual processor 220 may include a re-arranger 221, a dequantizer 222, an inverse transformer 223.

When a bitstream including video information is input, the video decoding device 200 may reconstruct a video in association with a process by which video information is processed in the video encoding device.

For example, the video decoding device 200 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

When coding is performed on the input picture, the coding may be performed based on one processing unit. The processing unit may be represented as a coding unit (CU). Meanwhile, as coding is performed in units of areas including similar information in the picture, transform efficiency may be improved and accordingly overall coding efficiency may be improved. In addition, as coding is performed in units of areas including similar information in the picture, prediction accuracy may be improved and accordingly overall coding efficiency may be improved. However, when only the quad tree (QT) structure is applied and the picture is split into square CUs, there may be a limitation in splitting the picture such that the CUs include only accurately similar information. In this case, the picture may be split into non-square CUs including information representing the specific object to enhance coding efficiency.

Figure 3:
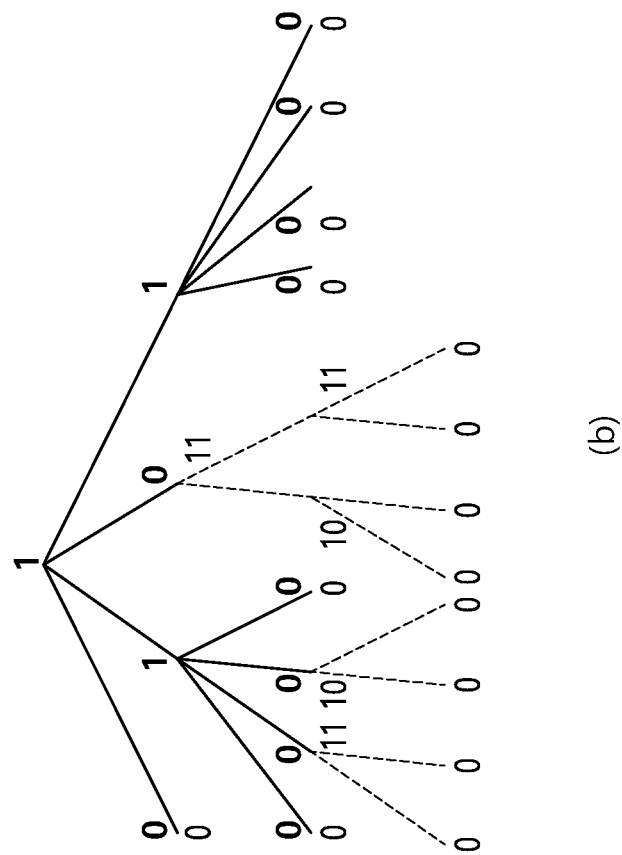
FIG. 3 illustrates a CU split through a quad tree binary tree (QTBT) structure and a signaling method of the QTBT structure.
Figure 3:
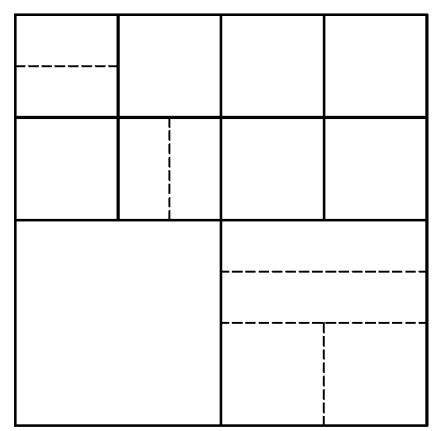

FIG. 3 illustrates a CU split through a quad tree binary tree (QTBT) structure and a signaling method of the QTBT structure.

The QTBT structure may represent a structure in which a CU (or CTU) is split through a QT structure and split through a binary tree (BT) structure. That is, the QTBT may represent a splitting structure configured by combining the QT structure and the BT structure. When a picture is coded in units of CTU, the CTU may be split through the QT structure. A leaf node of the QT structure may be further split through the BT structure. Here, the leaf node may represent a CU which is not split any further in the QT structure, and the leaf node may be called an end node. In addition, the QT structure may represent a structure in which a CU (or CTU) having a 2N×2N size is split into four sub-CUs having a N×N size, and the BT structure may represent a structure in which a CU having a 2N×2N size is split into two sub-CUs having a N×2N (or nL×2N, nR×2N) size or two sub-CUs having a 2N×N (or 2N×nU, 2N×nD) size. Referring to FIG. 3(a), the CU may be split into square CUs of a deeper depth through the QT structure, and a specific CU among the square CUs may be split into non-square CUs of a deeper depth through the BT structure.

FIG. 3(b) illustrates an example of syntax signaling of the QTBT structure. The solid line illustrated in FIG. 3(b) may represent the QT structure and the dotted line may represent the BT structure. Also, from the top to the bottom, the syntax for CUs from a higher depth to a deeper depth may be represented. In addition, the syntax for the upper left side, the upper right side, the lower left side, and the lower right side CUs in the left-to-right direction may be represented. Specifically, the uppermost number may represent a syntax for a CU of n depth, the numbers at the second position from above may represent a syntax for CUs of n+1 depth, the numbers at the third position from above may represent a syntax for CUs of n+2 depth, and the numbers at the fourth position from above may represent a syntax for CUs of n+3 depth. Also, the numbers in the bold may represent values of syntaxes for the QT structure, and numbers not represented in the bold may represent values of syntaxes for the BT structure.

Referring to FIG. 3(b), a QT split flag indicating whether a CU is split through the QT structure may be transmitted. That is, a flag indicating whether a CU having a 2N×2N size is split into 4 sub-CUs having an N×N size may be transmitted. For example, if the value of the QT split flag for the CU is 1, the CU may be split into 4 sub CUs, and if the value of the QT split flag for the CU is 0, the CU may not be split. In addition, information on a maximum CU size, a minimum CU size, and a maximum depth in the QT structure may be transmitted to adjust the QT structure for the input image. The information on the QT structure described above may be transmitted for each of the slice types or may be transmitted for each of image components (luminance component, saturation component, etc.). Meanwhile, the information about the BT structure may be transmitted to the end node which is not split any further in the QT structure. That is, information on the BT structure for the CU corresponding to the end node in the QT structure may be transmitted. Here, information including the information on the BT structure may be referred to as additional splitting information. For example, a BT split flag indicating whether the CU is split through the BT structure, i.e., whether the BT structure for the CU is applied, may be transmitted. Specifically, when the value of the BT split flag is 1, the CU may be split into two sub-CUs, and when the value of the BT split flag is 0, the CU may not be split. In addition, information on the maximum CU size, the minimum CU size, the maximum depth in the BT structure, and the like, may be transmitted to adjust the BT structure for the input image. The information about the BT structure described above may be transmitted for each of the slice types or may be transmitted for each of the image components. When the CU is split through the BT structure, the CU may be split in a horizontal or vertical direction. A BT split mode index indicating a direction in which the CU is split, i.e., a split type of the CU, may be further transmitted.

Meanwhile, when inter-prediction is performed as described above, a predicted block including prediction samples for a current block may be generated. Here, the predicted block includes predicted samples in a spatial domain (or pixel domain). The predicted block may be derived similarly in the encoding device and the decoding device, and the encoding device may signal information about residual (residual information) between the original block and the predicted block, rather than an original sample value of the original block, to the decoding device, thus enhancing image coding efficiency. The decoding device may derive a residual block including residual samples based on the residual information, add the residual block and the predicted block to generate a reconstructed block including reconstructed samples, and generate a reconstructed picture including the reconstructed blocks.

However, when motion vectors of neighboring blocks in the current picture are different during inter-prediction, predicted samples are derived from reference blocks located in different regions (i.e., not adjacent to each other), having a tendency that discontinuity in the block boundary regions of the neighboring blocks increases. Such discontinuity may be considered a prediction error at the block boundaries. In order to compensate for the prediction error at the block boundaries, filtering may be performed on the block boundary region of the current block in consideration of relative positions of the adjacent block (neighboring block) and the current block. Specifically, for example, when the neighboring block is a left block of the current block and, a motion vector of the current block is MV1, and a motion vector of the neighboring block is MV2, filtering may be performed on the block boundary region of the current block by weighted-summing a reference block 1 derived based on the current block and MV1 and a reference block 2 derived based on a right block of the neighboring block and MV2. In another example, when the neighboring block is an upper block of the current block, the motion vector of the current block is MV1 and the motion vector of the neighboring block is MV2, filtering may be performed on the block boundary region of the current block by weighted-summing a reference block 1 derived based on the current block and MV1 and a reference block 2 derived based on a lower block of the neighboring block and MV2. This filtering may be termed overlapped boundary motion compensation (OBMC). In this case, the filtering may be applied in units of sub-blocks (subunits) to the block boundary region of the current block. For example, n×n subunits adjacent to the block boundary of the current block may be derived (e.g., n=4), and the above-described filtering may be applied in units of n×n subunits.

Figure 4:
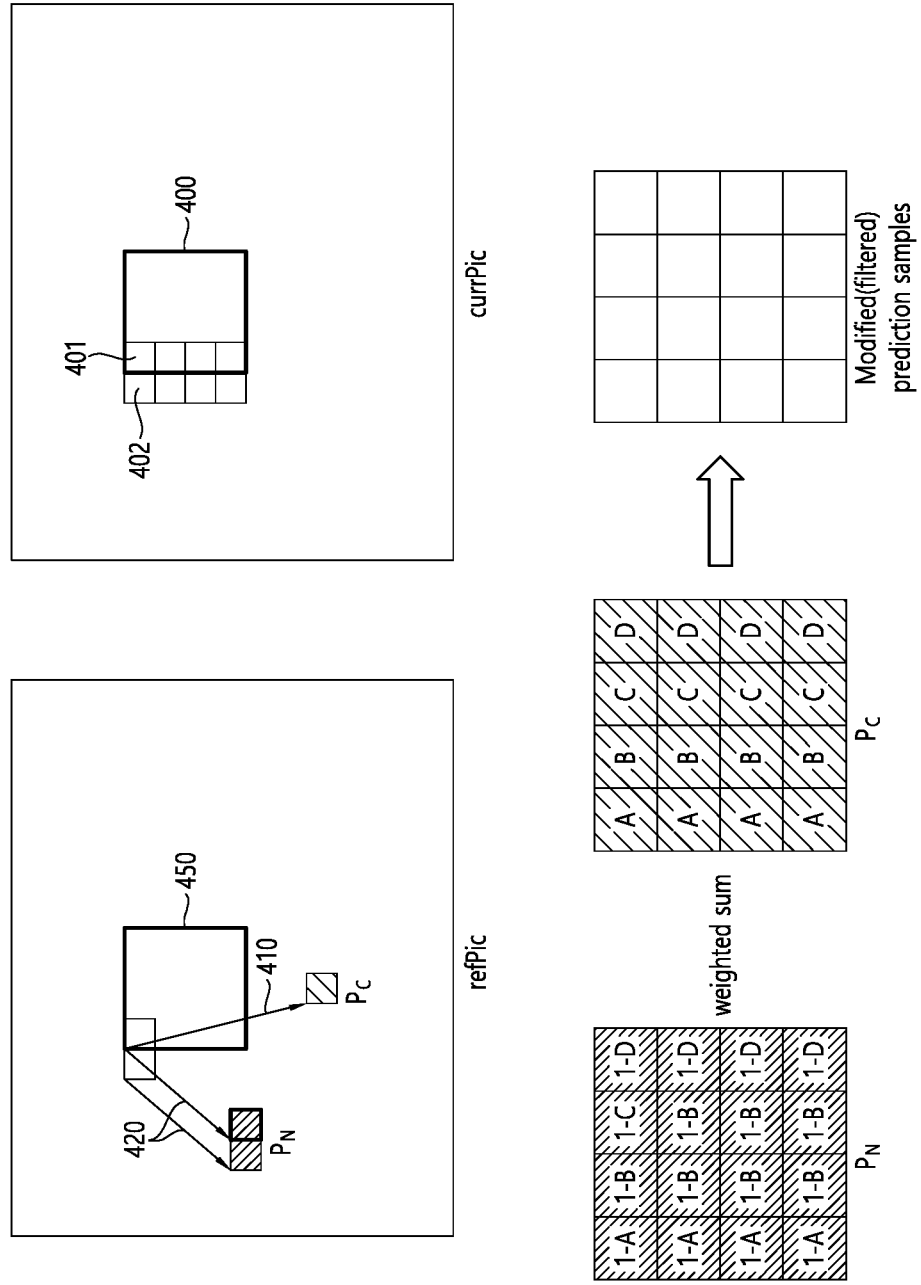
FIG. 4 illustrates an overlapped boundary motion compensation (OBMC) method according to an example of the present invention.

FIG. 4 illustrates an OBMC method according to an embodiment of the present invention. FIG. 4 illustrates an example of performing OBMC on the left boundary of the current block when the motion vector of the current block is different from the motion vector of the left block adjacent to the current block.

According to the use of the QTBT structure, a block having a ratio which does not exist may be derived, and in consideration of this, OBMC may be applied adaptively.

In order to determine whether OBMC is applied according to the present invention, the encoding device may compare rate-distortion (RD) costs before and after applying OBMC to the target block. The encoding device may signal flag information on whether OBMC is applied to the current block to the decoding device. The flag information on whether OBMC is applied may be referred to as an OBMC flag. Meanwhile, signaling the OBMC flag in units of blocks for all object blocks may degrade coding efficiency, and thus, a method for efficiently reducing the amount of data for signaling the flag information is required. For example, whether OBMC is applied may be determined by signaling the OBMC flag in units of coding blocks (i.e., by the coding block), rather than in units of prediction blocks, or it may be determined that OBMC is implicitly applied to a block larger than a specific size without an OBMC flag and whether to apply the OBMC may be determined by explicitly signaling the OBMC flag when a block is equal or smaller than the specific size.

Meanwhile, when the QTBT structure is applied, non-square blocks of various ratios may be used for coding a current picture. For example, blocks having the sizes illustrated in the following table may be used.

TABLE 1

| |
| --- |
| 4 × 4, 4 × 8, 4 × 16, 4 × 32, |
| 8 × 4, 8 × 8, 8 × 16, 8 × 32, 8 × 64, |
| 16 × 4, 16 × 8, 16 × 16, 16 × 32, 16 × 64, 16 × 128, |
| 32 × 4, 32 × 8, 32 × 16, 32 × 32, 32 × 64, 32 × 128, |
| 64 × 8, 64 × 16, 64 × 32, 64 × 64, 64 × 128, |
| 128 × 16, 128 × 32, 128 × 64, 128 × 128 |

The types of blocks may vary depending on a minimum size (min), a maximum size (max), and a depth of the QuadTree and a minimum size (min), a maximum size (max), and a depth of the BinaryTree.

Basically, as the size of the block increases, OBMC performance may be enhanced, and in the encoder and decoder end, it may be set such that OBMC is implicitly applied to a block greater than a specific size (e.g., 16×16). Of course, in this case as well, OBMC is not applied when the MV of the current block is the same as the MV of the neighboring block (or when the neighboring block is intra-coded). It is the same with the following.

Meanwhile, shapes of blocks vary according to the introduction of QTBT as described above, and in this case, whether OBMC is applied may be determined by separately comparing a width and a height with a reference (threshold value). For example, in case where a specific size of 16×16 is a reference, if only one or the width and height exceeds 16, whether OBMC is applied must be determined separately (using the OBMC flag, or the like), but even when only one of the width and height is larger than the reference, OBMC may be set to be implicitly applied. Alternatively, a width reference and a height reference may be separately set. For example, when a condition for a case where the width is greater than 16 or the height is greater than 16 is applied, OBMC applied blocks may vary as follows. In a table below, OBMC applied blocks are indicated in bold.

TABLE 2

| width × height > 16 × 16 | width > 16 or height > 16 |
|---|---|
| 4 × 4, 4 × 8, 4 × 16, 4 × 32, 8 × 4, 8 × 8, 8 × 16, 8 × 32, 8 × 64, 16 × 4, 16 × 8, 16 × 16, 16 × 32, 16 × 64, 16 × 128, 32 × 4, 32 × 8, 32 × 16, 32 × 32, 32 × 64, 32 × 128, 64 × 8, 64 × 16, 64 × 32, 64 × 64, 64 × 128, 128 × 16, 128 × 32, 128 × 64, 128 × 128 | 4 × 4, 4 × 8, 4 × 16, 4 × 32, 8 × 4, 8 × 8, 8 × 16, 8 × 32, 8 × 64, 16 × 4, 16 × 8, 16 × 16, 16 × 32, 16 × 64, 16 × 128, 32 × 4, 32 × 8, 32 × 16, 32 × 32, 32 × 64, 32 × 128, 64 × 8, 64 × 16, 64 × 32, 64 × 64, 64 × 128, 128 × 16, 128 × 32, 128 × 64, 128 × 128 |

When the OBMC applied condition is changed as described above, OBMC may also be applied to blocks having 4×32 size, 8×32 size, 32×4 size, and 32×8 size.

As compared with implicitly applying OBMC when (width×height>16×16), when an application condition is changed to implicitly apply OBMC when (width>16 or height>16), the following results may be obtained. The table below illustrates the results of applying a corresponding algorithm in a joint exploration model (JEM) 3.1. This is applied to Class A to Class D of common test condition (CTC) sequences and is the result of an experiment with 33 frames of each sequence.

TABLE 3

|  | Y | U | V |
|---|---|---|---|
| ClassA1 | 0.0% | 0.1% | 0.1% |
| ClassA2 | −0.6% | −0.5% | −0.4% |
| ClassB | −0.6% | −0.2% | −0.2% |
| ClassC | −0.1% | 0.4% | 0.3% |
| ClassD | 0.1% | −0.1% | 0.2% |
| CTC | −0.2% | −0.1% | 0.0% |

As illustrated in the table, it can be seen that, when the application conditions are changed according to the above-described method, coding efficiency is increased by 0.2% and 0.1% overall for each of a luma component Y and a chroma component U.

Meanwhile, the above-described example is merely an example. According to the present invention, a size of the reference block may be variously changed, and references of the width and height may be set to be different. Also, the reference may be set to be different depending on the ratio of the blocks. For example (width>16 and height>32), (width>height), (width<height), (width>height and height>16), (width==height*2), and the like, may be applied. Here, 16, which is the width or height reference for OBMC application is merely an example, and other reference values defined in the encoder and decoder stages may also be applicable. In addition, the reference may be applied equally to the entire image (picture) or may be signaled through a video parameter set (VPS), a sequence parameter set (SPS), a picture parameter set (PPS), or a slice header. The decoding device may determine whether OBMC is applied based on the reference (value).

According to the OBMC method of the present invention, as described above, a partial region of the first reference block indicated by the motion vector of the current block with respect to the current block and a partial region of the second reference block indicated by the motion vector of the neighboring block with respect to the current block may be weighted-summed by the subunit. When motion information is stored by the 4×4 block in the video coding system, different motion vectors may exist by the 4×4 block. Thus, in consideration of this, OBMC may be applied to the current block by the 4×4 subunit. However, if the size of the block is equal to or smaller than a certain size such as 8×4 or 4×8, applying OBMC by the 4×4 subunit is similar to applying filtering to the current block overall, as well as to the periphery of a block boundary of the current block, which may distort a major object image in the block (i.e., over smoothing) to rather degrade prediction efficiency. Thus, according to the present invention, OBMC may be applied by adaptively determining a size of the subunit for OBMC application based on the size of the current block. For example, according to the present invention, weighting factors may be applied (i.e., OBMC may be applied) to the current block having a size equal to or smaller than the certain size such as 8×4 or 4×8 based on the subunits having sizes of 2×4 and 4×2. When the aforementioned QTBT structure is used, 16×4, 4×16, 32×4, 4×32, as well as 4×8 and 8×4 as blocks in which a length of one side is 4, may be used, and in this case, the weighting factors may be applied by the 2×4 or 4×2 subunit. That is, when a condition of (width==4 or height==4) is satisfied, the weighting factors may be applied based on subunits having sizes of 2×4 and 4×2 or subunits having a size of 2×2. In other words, when the width of the current block is 4, the weighting factors may be applied by the 2×4 subunit, and when the height of the current block is 4, the weighting factors may be applied by the 4×2 subunit. However, this is merely an example and the size of the reference block may be variously changed, and the reference of the width and height may be set to be different. Also, the reference may be set to be different depending on the ratio of the blocks. In addition, the subunit size for applying the weighting factors may be changed to 1×4, 4×1, and the like.

The following table illustrates the results of applying weighting factors to 2×4 or 4×2 area for blocks in which one side is 4 in JEM 3.1. Class A to Class D of the CTC sequences were applied and the experimental results were obtained from 33 frames of each sequence.

TABLE 4

|  | Y | U | V |
|---|---|---|---|
| ClassA1 | 0.0% | −0.1% | 0.0% |
| ClassA2 | 0.0% | 0.2% | 0.2% |
| ClassB | −0.6% | 0.0% | 0.1% |
| ClassC | −0.1% | −0.1% | 0.1% |
| ClassD | −0.1% | −0.2% | −0.1% |
| CTC | −0.2% | 0.0% | 0.0% |

As illustrated in the table, it can be seen that, when the applied subunit unit is changed according to the above-described method, coding efficiency was increased by 0.2% overall for the luma component Y.

Meanwhile, as described above, according to the use of the QTBT structure, the current block to be predicted may have a non-square structure. In this case, the width and height of the current block may have different values. In this case, whether OBMC is applied may be determined by the block or by the block boundary. That is, whether OBMC is applied may be determined by distinguishing between a left boundary and an upper boundary of the current block. For example, whether OBMC is applied to the current block may be first determined, and thereafter, whether OBMC is applied to the left boundary and/or upper boundary may be secondly determined. Specifically, for example, whether OBMC is applied to the current block may be first determined based on the implicit reference and/or the signaled flag information described above, and whether OBMC is applied to the left boundary and/or the upper boundary may be secondly determined based on the length of the left boundary of the current block and/or the upper boundary of the current block. In another example, whether OBMC is applied to the current block may be omitted and whether OBMC is applied to the left boundary and/or the upper boundary may be directly determined.

Figure 5:
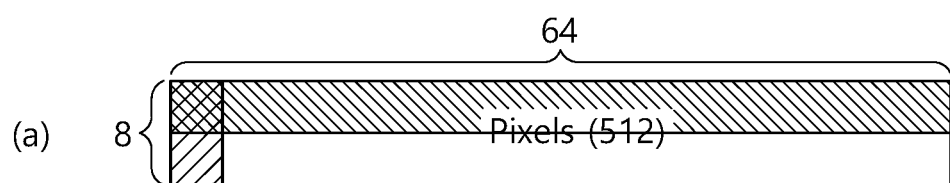
FIGS. 5 and 6 are examples of determining whether to apply the OBMC by separating left boundary and upper boundary.
Figure 5:
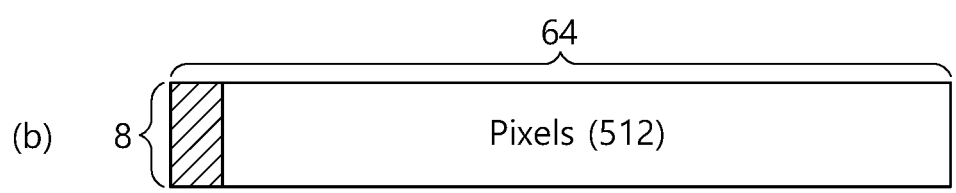
Figure 5:
Figure 6:
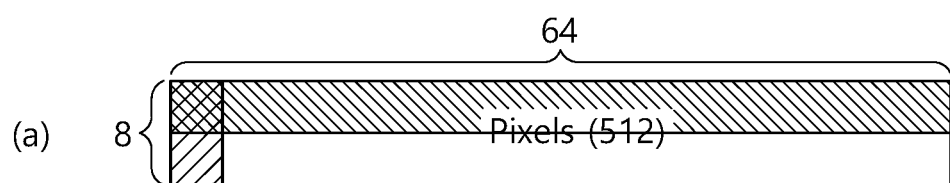
Figure 6:
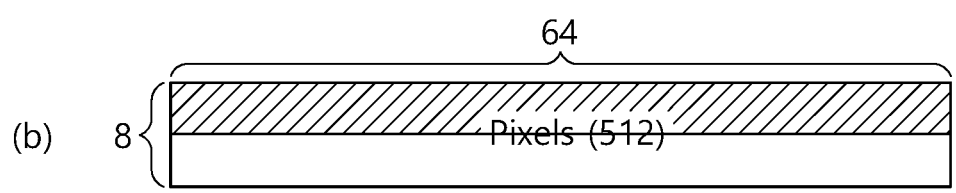
Figure 6:

FIGS. 5 and 6 illustrate examples of determining whether OBMC is applied separately to the left boundary and the upper boundary.

Referring to FIG. 5, when OBMC is applied to the current block as illustrated in (a), OBMC may be applied to all block boundaries. Meanwhile, if the length of the left boundary is equal to or smaller than a predetermined reference (e.g., 8) as illustrated in (b), OBMC may be applied only to the left boundary. This may be determined that, for example, if the current block is not square and the height is smaller than a predetermined reference, OBMC is not applied to the upper boundary. This is because application of OBMC to the upper boundary even when the height of the current block is equal to or smaller than the predetermined reference may rather degrade overall prediction performance.

Meanwhile, when the current block is not square and the length of the left boundary is equal to or smaller than the predetermined reference as illustrated in (b) of FIG. 6, it may be determined that OBMC is not applied to the left boundary but applied only to the upper boundary.

The reference value for determining whether to apply OBMC separately to the left boundary and the upper boundary may be set in advance to a specific value other than 8 described in the above example, or information about the reference value (OBMC boundary reference value Information) may be explicitly signaled to the decoder end. The reference value may be equally applied to the entire image (picture) or may be signaled through a VPS, SPS, PPS, or slice header. The decoding device may determine whether OBMC is applied to the left boundary and/or the upper boundary based on the reference value.

Meanwhile, in applying OBMC as described above, the first reference subunit (derived based on the MV of the current block) and the second reference subunit (derived based on MV of the neighboring block) are weighted-summed using the weighting factors. In this case, a relatively greater weighting factor may be assigned to a reference sample searched by the motion vector of the neighboring block as it is closer to the target boundary. For example, the weighting factors may be set as follows

TABLE 5

$\{3/4, 1/4\}, \{7/8, 1/8\}, \{15/16, 1/16\}, \{31/32, 1/32\}$

Here, the left factors in { } represent a weight for a reference sample of the first reference subunit, and the right factors thereof represent a weight for a reference sample of the second reference subunit.

If the target boundary is the left boundary, ¾ represents a weight for a reference sample in a first column on the left of the first reference subunit and ¼ represents a weight for a reference sample in a first column on the left of the second reference subunit, ⅞ represents a weight for a reference sample in a second column on the left of the first reference subunit and ⅛ represents a weight for a reference sample in a second column on the left of the second reference subunit, 15/16 represents a weight for a reference sample in a third column on the left of the first reference subunit and 1/16 represents a weight for a reference sample in a third column on the left of the second reference subunit, and 31/32 represents a weight for a reference sample in a fourth column on the left of the first reference subunit and 1/32 represents a weight for a reference sample in a fourth column on the left of the second reference subunit. Meanwhile, in case where 2×4 and 4×2 or 1×4 and 4×1 subunits, as well as the 4×4 subunit, are used as described above, the weighting factors may be simplified as follows, for example, in consideration of rows and/or columns based on the target boundary.

TABLE 6

$\{3/4, 1/4\}, \{7/8, 1/8\}$

Meanwhile, as the current block to be predicted is a smaller block, a predicted block is highly likely to be a block close to the original block. That is, it indicates an optimal block having a small amount of residual signals. In this case, since the influence of the neighboring block on the weighting factors described above is relatively high, the influence may be reduced. That is, it means that, as the current block is predicted by the smaller block, correlation between the current block and the neighboring block is small. Therefore, in performing OBMC, it may be set such that a relatively small weighting factor is applied to the reference sample (second reference sample of the second subunit) derived by the motion vector (second motion vector) of the neighboring block.

Therefore, if the size of the current block is smaller than the predetermined size (e.g., 8×8, 4×4, 8×4, 4×8, etc.), weighting factors modified as in the following tables may be applied to reduce the influence of the neighboring block.

TABLE 7

$\{7/8, 1/8\}, \{15/16, 1/16\}$

TABLE 8

$\{15/16, 1/16\}, \{31/32, 1/32\}$

Meanwhile, the values disclosed in the above tables are merely examples, and various weighting factors for reducing the influence of the neighboring block may be applied to a smaller block. Here, different weighting factors may be applied depending on a size or a shape of a block.

Figure 7:
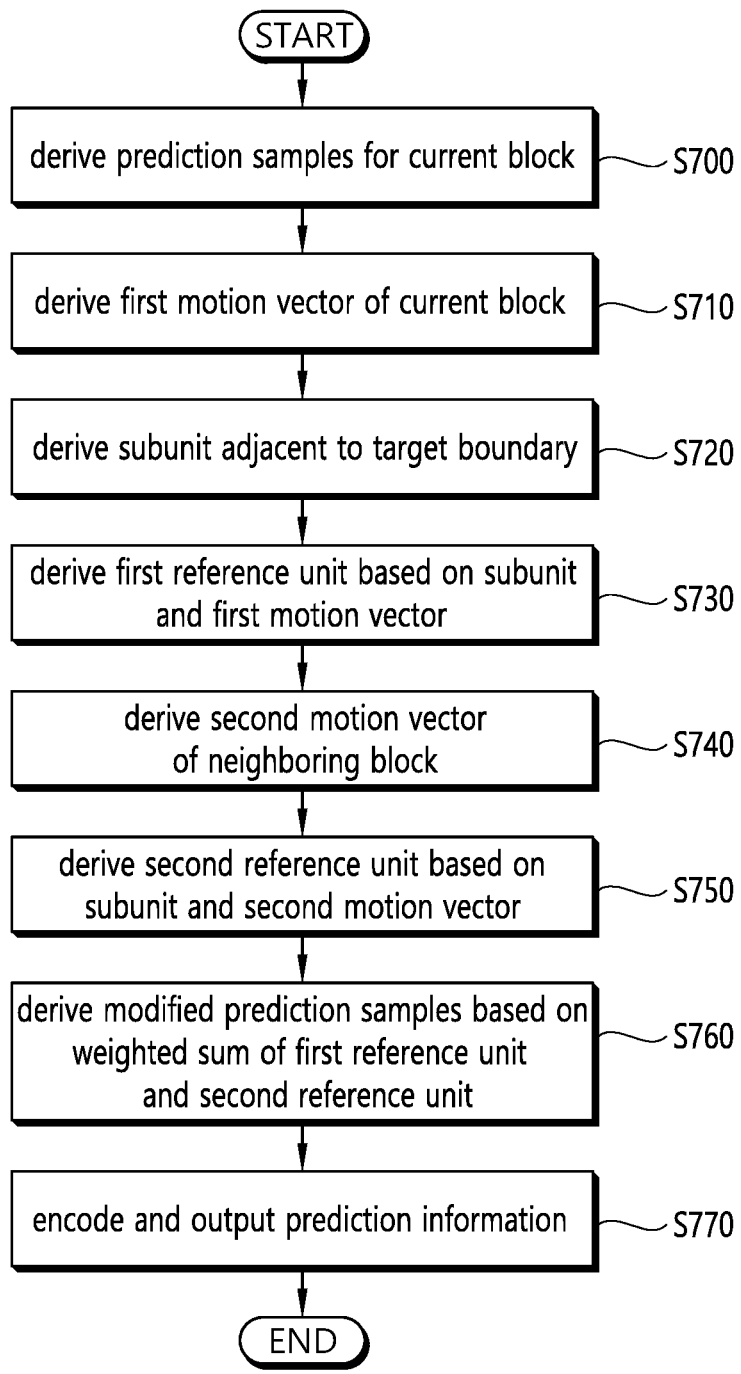
FIG. 7 is a flowchart illustrating an example of an inter-prediction method in image coding according to the present invention.

FIG. 7 schematically illustrates an example of an inter-prediction method in image coding according to the present invention. The method disclosed in FIG. 7 may be performed by the encoding device disclosed in FIG. 1. Specifically, for example, steps S700 to S760 of FIG. 7 may be performed by the predictor of the encoding device, and step S770 may be performed by the entropy encoder of the encoding device.

Referring to FIG. 7, the encoding device derives prediction samples for a current block (S700). The encoding device may search for a reference block having an optimal rate-distortion (RD) cost on a reference picture through a motion estimation procedure and duplicate prediction samples of the reference block to drive the prediction samples for the current block.

The encoding device derives a first motion vector of the current block (S710). The encoding device may derive a first motion vector indicating the reference block based on a position of the current block and a position of the reference block. The first motion vector may be signaled to the decoding device according to a defined procedure according to an inter-prediction mode (e.g., merge mode, MVP mode) of the current block.

The encoding device derives a subunit of the current block to perform OBMC according to the present invention (S720). The subunit is located adjacent to a target boundary of the current block. The subunit may have a square or non-square shape. For example, the subunit may have a 4×4 size. Alternatively, the subunit may have a size of 2×4, 4×2, 1×4, or 4×1. In this case, the subunit may adaptively have the size of 4×4, 2×4, 4×2, 1×4, or 4×1 based on the size of the current block. For example, if the width or height of the current block is 4 or smaller, the subunit may have the size of 2×4, 4×2, 1×4, or 4×1.

Meanwhile, the encoding device may determine whether OBMC is applied.

In an example, the encoding device may determine whether OBMC is implicitly applied to the current block based on the size (width or height) of the current block and a predefined reference value. For example, the encoding device may implicitly determine that OBMC is applied to the current block if the size of the current block exceeds a specific reference value. Alternatively, the encoding device may implicitly determine that OBMC is applied to the current block when the width or height of the current block exceeds a specific reference value. In this case, the reference value for the width and the reference value for the height may be set to be different. That is, a first reference value may be set for the width of the current block, a second reference value may be set for the height, and when the width exceeds the first reference value or the height exceeds the second reference value, It may be determined that OBMC is applied to the current block. The specific reference value may be previously defined or may be signaled via a video parameter set (VPS), a sequence parameter set (SPS), a picture parameter set (PPS), or a slice header.

In another example, the encoding device may determine whether OBMC is applied by comparing RD costs before and after applying OBMC. In this case, the encoding device may signal OBMC flag information indicating whether OBMC is applied to the decoding device.

Meanwhile, the determination as to whether OBMC is applied may be determined in units of block boundaries. That is, even when OBMC is applied to the current block, OBMC may be applied to only one of the left boundary and the upper boundary of the current block. For example, when the height of the current block is equal to smaller than a specific reference value, it may be determined that OBMC is not applied to the left boundary or the upper boundary of the current block. In another example, when the width of the current block is equal to or smaller than or the specific reference value, it may be determined that OBMC is not applied to the left boundary or the upper boundary of the current block.

The encoding device derives a first reference unit (array of reference samples) based on the subunit and the first motion vector (S730). The encoding device may derive a reference unit at a position indicated by the first motion vector based on the left and upper sample positions of the subunit as a first reference unit. The first reference unit has the same size as the subunit and includes first reference samples.

The encoding device derives drives a second motion vector of a neighboring block adjacent to the target boundary (S740) and derives a second reference unit (array of reference samples) based on the subunit and the second motion vector (S750). The encoding device may derive a reference unit at a position indicated by the second motion vector based on a upper left sample position of the subunit as a second reference unit. The second reference unit has the same size as the subunit and includes second reference samples. Alternatively, as described above with reference to FIG. 4, a neighboring subunit corresponding to the subunit and a right or lower subunit of the reference unit derived from the second motion vector may be derived as the second reference unit.

The encoding device derives modified prediction samples based on the weighted sum of the first reference unit and the second reference unit (S760). That is, the encoding device may derive modified prediction samples based on the weighted sum of the first reference samples and the second reference samples. In this case, the first reference samples and the second reference samples may be weighted-summed on a phase basis.

The modified prediction samples are modified prediction samples for prediction samples located in the subunit among the prediction samples for the current block. That is, the predicted samples of the current block may be replaced with the modified prediction samples for the subunit region. OBMC may be sequentially or concurrently performed on a plurality of sub units located at a target boundary of the current block.

The weighting factors used for the weighted sum may be set based on various references and may include Tables 5 to 8 described above.

For example, a weighting factor applied to the reference sample in the first reference unit may be set to be larger than a weighting factor applied to a corresponding reference sample in the second reference unit.

If the target boundary is the left boundary of the current block, the weighting factor for the first reference sample in the n-th column from the target boundary among the reference sample at an nth row from the target boundary among the reference samples in the first reference unit may be set to be smaller than the weight factor for the second reference sample at an (n+1)-th row from the target boundary. Alternatively, when the target boundary is the upper boundary of the current block, a weighting factor for the first reference sample at the nth row from the target boundary among the reference samples in the first reference unit may be set to be smaller than the weight factor for the second reference sample at the (n+1)th row from the target boundary.

Also, weighting factors for reference samples in the first reference unit may be derived based on the size of the current block. For example, a weighting factor for a specific reference sample among the reference samples in the first reference unit may have a larger value when the size of the current block is smaller than a specific reference size than when the size of the current block is not smaller than the specific reference size.

The encoding device encodes and outputs inter-prediction information (S770). The inter-prediction information may include information on the first motion vector of the current block. For example, the information on the first motion vector may include a merge index for the current block. In another example, the information on the first motion vector may include an MVP flag, motion vector difference (MVD) information, and the like. In addition, the inter-prediction information may include inter-prediction mode information of the current block.

The encoding device may encode the inter-prediction information and output it as a bitstream. The bitstream may be transmitted to a decoding device via a network or a storage medium.

Figure 8:
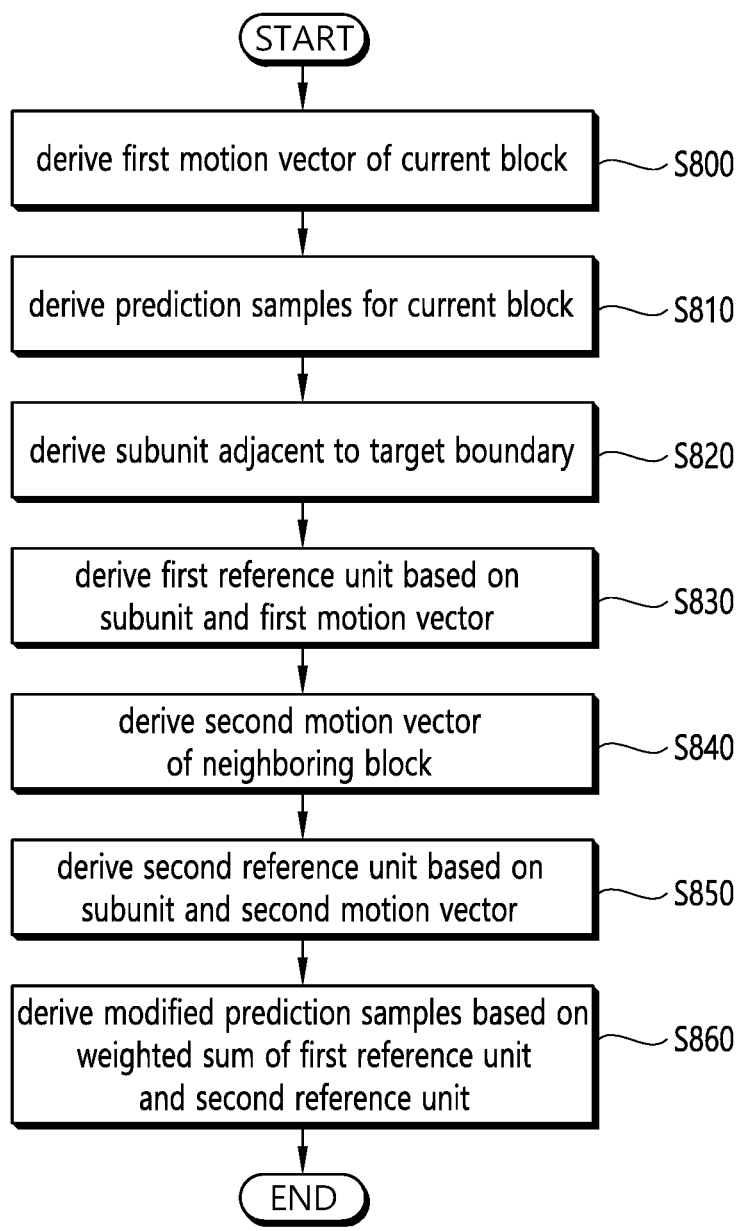
FIG. 8 is a flowchart illustrating an example of an inter-prediction method in image coding according to the present invention.

FIG. 8 schematically illustrates an example of an inter-prediction method in image coding according to the present invention. The method disclosed in FIG. 8 may be performed by the decoding device disclosed in FIG. 2. Specifically, for example, steps S800 to S860 of FIG. 8 may be performed by the predictor of the decoding device.

Referring to FIG. 8, the decoding device derives a first motion vector of a current block (S800). The decoding device may derive the first motion vector from the current block based on the inter-prediction information obtained through the bitstream. The bitstream may be received from an encoding device via a network or storage medium. For example, the decoding device may generate a merge candidate list based on neighboring blocks of the current block and derive a motion vector of a merge candidate selected from the merge candidate list using a merge index included in the inter-prediction information, as the first motion vector. In another example, the decoding device may generate an MVP candidate list based on neighboring blocks of the current block, select a specific MVP candidate based on an MVP flag included in the inter-prediction information, and derive the first motion vector using the motion vector of the selected MVP candidate and MVD derived from MVD information included in the inter-prediction information.

The decoding device derives prediction samples for the current block (S810). The decoding device may derive prediction samples based on the first motion vector. The decoding device may derive prediction samples for the current block by duplicating constructed samples of a reference block indicated by the first motion vector with respect to a position of the current block on the reference picture.

The decoding device derives a subunit of the current block to perform OBMC according to the present invention (S720). The subunit is located adjacent to the target boundary of the current block. The subunit may have a square or a non-square shape. For example, the subunit may have a 4×4 size. Alternatively, the subunit may have a size of 2×4, 4×2, 1×4, or 4×1. In this case, the subunit may adaptively have a size of 4×4, 2×4, 4×2, 1×4, or 4×1 based on the size of the current block. For example, if the width or height of the current block is 4 or smaller, the subunit may have a size of 2×4, 4×2, 1×4, or 4×1.

Meanwhile, the decoding device may determine whether OBMC is applied.

In an example, the decoding device may determine whether OBMC is implicitly applied to the current block based on the size (width or height) of the current block and a predefined reference value. For example, the decoding device may implicitly determine that OBMC is applied to the current block if the size of the current block exceeds a specific reference value. Alternatively, the decoding device may implicitly determine that OBMC is applied to the current block when the width or height of the current block exceeds a specific reference value. In this case, the reference value for the width and the reference value for the height may be set to be different. That is, a first reference value may be set for the width of the current block, a second reference value may be set for the height, and when the width exceeds the first reference value or the height exceeds the second reference value, It may be determined that OBMC is applied to the current block. The specific reference value may be previously defined or may be signaled via a video parameter set (VPS), a sequence parameter set (SPS), a picture parameter set (PPS), or a slice header.

In another example, the decoding device may determine whether OBMC is applied based on OBMC flag information signaled from the encoding device.

Meanwhile, the determination as to whether OBMC is applied may be determined in units of block boundaries. That is, even when OBMC is applied to the current block, OBMC may be applied to only one of the left boundary and the upper boundary of the current block. For example, when the height of the current block is equal to smaller than a specific reference value, it may be determined that OBMC is not applied to the left boundary or the upper boundary of the current block. In another example, when the width of the current block is equal to or smaller than or the specific reference value, it may be determined that OBMC is not applied to the left boundary or the upper boundary of the current block.

The decoding device derives a first reference unit (array of reference samples) based on the subunit and the first motion vector (S830). The decoding device may derive a reference unit at a position indicated by the first motion vector based on the left and upper sample positions of the subunit as a first reference unit. The first reference unit has the same size as the subunit and includes first reference samples.

The decoding device derives drives a second motion vector of a neighboring block adjacent to the target boundary (S840) and derives a second reference unit (array of reference samples) based on the subunit and the second motion vector (S850). The decoding device may derive a reference unit at a position indicated by the second motion vector based on a upper left sample position of the subunit as a second reference unit. The second reference unit has the same size as the subunit and includes second reference samples. Alternatively, as described above with reference to FIG. 4, a neighboring subunit corresponding to the subunit and a right or lower subunit of the reference unit derived from the second motion vector may be derived as the second reference unit.

The decoding device derives modified prediction samples based on the weighted sum of the first reference unit and the second reference unit (S860). That is, the decoding device may derive modified prediction samples based on the weighted sum of the first reference samples and the second reference samples. In this case, the first reference samples and the second reference samples may be weighted-summed on a phase basis.

The modified prediction samples are modified prediction samples for prediction samples located in the subunit among the prediction samples for the current block. That is, the predicted samples of the current block may be replaced with the modified prediction samples for the subunit region. OBMC may be sequentially or concurrently performed on a plurality of sub units located at a target boundary of the current block.

The weighting factors used for the weighted sum may be set based on various references and may include Tables 5 to 8 described above.

For example, a weighting factor applied to the reference sample in the first reference unit may be set to be larger than a weighting factor applied to a corresponding reference sample in the second reference unit.

If the target boundary is the left boundary of the current block, the weighting factor for the first reference sample in the n-th column from the target boundary among the reference sample at an nth row from the target boundary among the reference samples in the first reference unit may be set to be smaller than the weight factor for the second reference sample at an (n+1)th row from the target boundary. Alternatively, when the target boundary is the upper boundary of the current block, a weighting factor for the first reference sample at the nth row from the target boundary among the reference samples in the first reference unit may be set to be smaller than the weight factor for the second reference sample at the (n+1)th row from the target boundary.

Also, weighting factors for reference samples in the first reference unit may be derived based on the size of the current block. For example, a weighting factor for a specific reference sample among the reference samples in the first reference unit may have a larger value when the size of the current block is smaller than the specific reference size than when the size of the current block is not smaller than the specific reference size.

Meanwhile, although not shown, the decoding device may receive residual information on a residual sample of the current block from the bitstream. The residual information may include transform coefficients related to the residual sample.

The decoding device may derive the residual sample (or residual sample array) for the current block based on the residual information. The decoding device may generate a reconstructed sample based on the (modified) prediction sample and the residual sample and derive a reconstructed block or a reconstructed picture based on the reconstructed sample. Thereafter, the decoding device may apply an in-loop filtering procedure such as deblocking filtering and/or SAO procedure to the restored picture in order to improve subjective/objective image quality as necessary.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An inter-prediction method performed by a decoding apparatus, the inter-prediction method comprising:

deriving a first motion vector of a current block;

deriving prediction samples for the current block based on the first motion vector;

deriving a subunit located in the current block and adjacent to a target boundary of the current block;

deriving a first reference unit based on the subunit and the first motion vector;

deriving a second motion vector of a neighboring block adjacent to the target boundary;

deriving a second reference unit based on the subunit and the second motion vector; and deriving modified prediction samples based on a weighted sum using the first reference unit and the second reference unit, wherein when a height of the current block is equal to or smaller than a specific reference value, it is determined that OBMC is not applied to a left boundary or an upper boundary of the current block.

2. The inter-prediction method of claim 1, wherein the modified prediction samples are modified prediction samples for prediction samples located in the subunit among the prediction samples for the current block.

3. The inter-prediction method of claim 1, further comprising:

determining whether overlapped block motion compensation (OBMC) is applied to the current block, wherein when the OBMC is applied to the current block, modified prediction samples are derived based on the first reference unit and the second reference unit, and when a width or a height of the current block exceeds a specific reference value, it is determined that the OBMC is applied to the current block.

4. The inter-prediction method of claim 3, wherein the specific reference value is signaled via a video parameter set (VPS), a sequence parameter set (SPS), a picture parameter set (PPS), or a slice header.

5. The inter-prediction method of claim 1, further comprising:

receiving OBMC flag information; and determining whether OBMC is applied to the current block based on the OBMC flag information.

6. The inter-prediction method of claim 1, further comprising:

determining whether OBMC is applied to the current block, wherein a first reference value is set for a width of the current block, a second reference value is set for a height of the current block, and when the width exceeds the first reference value or the height exceeds the second reference value, it is determined that OBMC is applied to the current block.

7. The inter-prediction method of claim 1, wherein the subunit has a non-square shape.

8. The inter-prediction method of claim 7, wherein the subunit has a size of 2×4, 4×2, 1×4, or 4×1.

9. The inter-prediction method of claim 8, wherein when a width or a height of the current block is equal to or smaller than 4, the subunit has a size of 2×4, 4×2, 1×4, or 4×1.

10. The inter-prediction method of claim 1, wherein a weighting factor applied to a reference sample in the first reference unit is greater than a weighting factor applied to a corresponding reference sample in the second reference unit.

11. The inter-prediction method of claim 1, wherein when the target boundary is a left boundary of the current block, a weighting factor for a first reference sample at an nth row from the target boundary, among reference samples in the first reference unit, is smaller than a weighting factor for a second reference sample at an (n+1)th row from the target boundary.

12. The inter-prediction method of claim 1, wherein weighting factors for reference samples in the first reference unit are derived based on a size of the current block, and a weighting factor for a specific reference sample among the reference samples in the first reference unit has a larger value when the size of the current block is smaller than a specific reference size than when the size of the current block is not smaller than the specific reference size.

13. A decoding apparatus for inter-prediction, the decoding device comprising:
   an entropy decoder receiving inter-prediction information; and
   a predictor deriving a first motion vector of a current block based on the inter-prediction information, deriving prediction samples for the current block based on the first motion vector, deriving a subunit located in the current block and adjacent to a target boundary of the current block, deriving a first reference unit based on the subunit and the first motion vector, deriving a second motion vector of a neighboring block adjacent to the target boundary, deriving a second reference unit based on the subunit and the second motion vector, and deriving modified prediction samples based on a weighted sum of the first reference unit and the second reference unit,
   wherein when a height of the current block is equal to or smaller than a specific reference value, it is determined that OBMC is not applied to a left boundary or an upper boundary of the current block.

14. The decoding apparatus of claim 13, wherein a weighting factor applied to a reference sample in the first reference unit is greater than a weighting factor applied to a corresponding reference sample in the second reference unit.

* * * * *